US012810407B2

(12) United States Patent
Xiang et al.

(10) Patent No.: US 12,810,407 B2
(45) Date of Patent: Nov. 24, 2026

(54) ADAPTIVE SPATIAL PATTERN RECOGNITION FOR DEFECT DETECTION

(71) Applicant: Onto Innovation Inc., Wilmington, MA (US)

(72) Inventors: Longjiang Xiang, Tianjin (CN); Hongshuo Zhang, Tianjin (CN); Xin Song, Andover, MA (US)

(73) Assignee: Onto Innovation Inc., Wilmington, MA (US)

( * ) Notice: Subject to any disclaimer, the term of this patent is extended or adjusted under 35 U.S.C. 154(b) by 150 days.

(21) Appl. No.: 18/443,748

(22) Filed: Feb. 16, 2024

(65) Prior Publication Data

US 2024/0281953 A1 Aug. 22, 2024

Related U.S. Application Data

(60) Provisional application No. 63/485,593, filed on Feb. 17, 2023.

(51) Int. Cl.

| | |
|---|---|
| ***G06T 7/00*** | (2017.01) |
| ***G06V 10/764*** | (2022.01) |
| ***G06V 10/82*** | (2022.01) |

(52) U.S. Cl.

CPC .......... *G06T 7/0004* (2013.01); *G06V 10/764* (2022.01); *G06V 10/82* (2022.01); *G06T 2207/20084* (2013.01)

(58) Field of Classification Search

CPC ......... G06T 7/0004; G06T 2207/20084; G06T 2207/10004; G06T 2207/20081;

(Continued)

(56) References Cited

U.S. PATENT DOCUMENTS 5,991,699 A * 11/1999 Kulkarni ................. H10P 74/23 700/121
7,835,566 B2 11/2010 Reich et al.
(Continued)

FOREIGN PATENT DOCUMENTS

CN 103674965 A 3/2014
JP 4728968 B2 7/2011
(Continued)

OTHER PUBLICATIONS

Yuk et al, Feature-Learning-Based Printed Circuit Board Inspection via Speeded-Up Robust Features and Random Forest, 2018, Applied Sciences (2018) 8: 1-14. (Year: 2018).*

Yang et al, A robust vision inspection system for detecting surface defects of film capacitors, 2016, Signal Processing 124 (2016) 54-62. (Year: 2016).*

Zhong et al, Weighted Matrix Decomposition for Small Surface Defect Detection, 2022, Micromachines 14 (2023) 1-21. (Year: 2022).*

(Continued)

*Primary Examiner* — Kathleen M Broughton

(74) *Attorney, Agent, or Firm* — Merchant & Gould P.C.

(57) ABSTRACT

Systems and methods for identifying and classifying defects in a manufactured article, such as an article containing a semiconductor substrate, are provided. Inspection data generated by an inspection tool inspecting the manufactured article is used to generate a defect map. The defect map includes an arrangement of potential defect indicators. Thresholding is performed between potential defect indicators, removing, based on the dynamic thresholding, a subset of the potential defect indicators from the arrangement to generate a modified defect map. Based on the modified defect map, a defect can be identified and classified.

21 Claims, 8 Drawing Sheets

(58) Field of Classification Search
CPC ........ G06T 2207/30108; G06V 10/764; G06V 10/82; G06V 10/757; G06V 10/761; G06V 10/763; G01N 21/9501
See application file for complete search history.

(56) References Cited

U.S. PATENT DOCUMENTS

| | | | | |
|---|---|---|---|---|
| 10,657,638 | B2 | 5/2020 | Mulligan | |
| 10,713,534 | B2 | 7/2020 | Brauer | |
| 10,937,705 | B2 | 3/2021 | Smith et al. | |
| 2002/0181756 | A1 | 12/2002 | Shibuya et al. | |
| 2009/0220142 | A1 | 9/2009 | Matsushita et al. | |
| 2009/0297019 | A1 | 12/2009 | Zafar et al. | |
| 2018/0330493 | A1* | 11/2018 | Milligan | G06N 3/0409 |
| 2020/0234417 | A1 | 7/2020 | Cohen et al. | |
| 2020/0372631 | A1* | 11/2020 | Asbag | G06T 7/0004 |
| 2021/0181253 | A1 | 6/2021 | Bauer et al. | |
| 2022/0067911 | A1 | 3/2022 | Narasimhan et al. | |
| 2022/0334567 | A1 | 10/2022 | Bachiraju | |
| 2024/0202908 | A1* | 6/2024 | Rundo | G06T 7/0004 |

FOREIGN PATENT DOCUMENTS

| | | | |
|---|---|---|---|
| WO | 2005077024 | A2 | 8/2005 |
| WO | 2022226095 | A1 | 10/2022 |
| WO | 2023092130 | A1 | 5/2023 |
| WO | 2023114666 | A1 | 6/2023 |
| WO | 2023230517 | A1 | 11/2023 |

OTHER PUBLICATIONS

Yu et al, Wafer map defect patterns classification based on a lightweight network and data augmentation, 2022, CAAI Transactions on Intelligence Technology 9(3): 1029-1042. (Year: 2022).*

Fan et al., "Wafer Defect Patterns Recognition Based on OPTICS and Multi-Label Classification," IEEE (Oct. 3, 2016), pp. 912-915 (4 pages).

Kim et al., "Advances in machine learning and deep learning applications towards wafer map defect recognition and classification: a review," Journal of Intelligent Manufacturing (Aug. 23, 2022) (33 pages).

Kim et al., "Detection and clustering of mixed-type defectpatterns in wafer bin maps," ISSN: 2472-5854 (Print) 2472-5862 (Online) Journal homepage: www.tandfonline.com/journals/uiie21 (Jan. 8, 2018) (14 pages).

Li et al., "A clustering algorithm using skewness-based boundary detection," Neurocomputing 275 (Sep. 20, 2017), 618-626 (9 pages).

Partial Search Report dated Jan. 7, 2026 from corresponding EP 24757720.8.

Wanbg et al., "Wafer Map Defect Pattern Recognition Using Rotation-Invariant Features ," IEEE Transactions on Semiconductor Manufacturing, vol. 32, No. 4, (Nov. 1, 2019) (9 pages).

Gross et al., "Fab Fingerprint for Proactive Yield Management," IEEE, May 10-12, 2021 (4 pages).

Yang, Yuan-Fu, "A Deep Learning Model for Identification of Defect Patterns in Semiconductor Wafer Map—Google patents," Date of Conference Jun. 9, 2019; Date added to IEEE Xplore—Aug. 8, 2019 (6 pages).

International Search Report and the Written Opinion dated Jun. 12, 2024 from corresponding PCT/US2024/016067 (13 pgs.).

* cited by examiner

ADAPTIVE SPATIAL PATTERN RECOGNITION FOR DEFECT DETECTION

CROSS-REFERENCE TO RELATED APPLICATION

This application claims the benefit of U.S. Provisional Application No. 63/485,593, filed Feb. 17, 2023, and titled "ADAPTIVE SPATIAL PATTERN RECOGNITION FOR DEFECT DETECTION." This application is related to PCT Application No. PCT/US2023/062838, filed Feb. 17, 2023, and titled "DEFECT DETECTION IN MANUFACTURED ARTICLES USING MULTI-CHANNEL IMAGES." The entire disclosures of both applications are incorporated herein by reference.

FIELD OF DISCLOSURE

The present disclosure is directed to improving reliability of defect detection in manufactured articles.

BACKGROUND

Manufactured articles include articles such as semiconductor devices, light emitting diodes (LEDs), and batteries (such as solid state batteries). Such articles can include fabricated substrates. For some articles, the fabricated substrates can be made from semiconductor material. The substrates of these articles can be manufactured with defects. The defects can be caused by faulty fabrication equipment, poorly calibrated fabrication equipment, environmental conditions, material contamination, and other causes. Correctly identifying and classifying defects in manufactured articles or partially manufactured articles is critical to quality control and maximizing output yield of those articles.

As mentioned, manufactured articles can include semiconductor devices, which include semiconductor substrates manufactured or fabricated as part of the formation of semiconductor chips or other types of integrated circuits (ICs). The components of the ultimate IC can be incorporated into the substrate through a series of fabrication steps. The fabrication steps can include deposition steps where a thin film layer is added onto the substrate. The substrate then may be coated with a photoresist and the circuit pattern of a reticle may be projected onto the substrate using lithography techniques. Etching processes, with etching tools may then occur.

For the completed article, whether for semiconductor device or another article, to be usable, each tool involved in the substrate fabrication process must perform within a predefined acceptable operation tolerance for the aspect of the article for which that tool is responsible. Tool performance can depend on factors outside of the tools themselves, such as environmental conditions (e.g., ambient light, ambient noise, dust, moisture, and so forth). Inspection tools and measuring tools are used as part of the substrate manufacturing process to ensure that the completed article meets a predefined specification. If even a single tool in the fabrication process is performing outside of its tolerance, a defect in a substrate of the article of sufficient magnitude can require all of the articles or partial articles in that fabrication run or a subsequent fabrication run to be scrapped, at potentially significant cost.

Different defects (e.g., scratches, tool marks, etc.) have different characteristic signatures or patterns depending on the type of defect and/or the tool responsible for the defect.

As the dimensions of semiconductors decrease, defect identification and classification become even more important to the successful manufacture.

SUMMARY

In general terms, systems and/or methods for identifying and classifying defects in a manufactured article, such as an article containing a semiconductor substrate, are provided. In example implementations, inspection data generated by an inspection tool inspecting the manufactured article is used to generate a defect map. In example implementations, the defect map includes an arrangement of potential defect indicators. In example implementations, thresholding is performed between potential defect indicators, removing, based on the dynamic thresholding, a subset of the potential defect indicators from the arrangement to generate a modified defect map. In example implementations, based on the modified defect map, a defect can be identified and classified.

An aspect of the present disclosure provides a method for classifying a defect in a manufactured article performed by a defect classification system, including receiving inspection data generated by an inspection tool inspecting the manufactured article, generating a defect map with the inspection data, the defect map including an arrangement of potential defect indicators, modifying a subset of the potential defect indicators based on at least one spatial attribute of the arrangement to generate a modified defect map, and classifying, with the machine learning model, the defect in the modified defect map, including determining a type of the defect.

Another aspect of the present disclosure provides a computer system for classifying a defect in a manufactured article, including one or more processors, and non-transitory computer readable storage media encoding instructions which, when executed by the one or more processors, causes the computer system to receive inspection data generated by an inspection tool inspecting the manufactured article, generate a defect map with the inspection data, the defect map including an arrangement of potential defect indicators, modify a subset of the potential defect indicators based on at least one spatial attribute of the arrangement to generate a modified defect map, and classify, with the machine learning model, the defect in the modified defect map, including determining a type of the defect.

Another aspect of the present disclosure provides a method of grouping two or more defect indicators on a surface of a manufactured article into a defect grouping, the method including comparing a distance between a first defect indicator and a second defect indicator to a dynamic threshold, wherein the dynamic threshold is a function of a distribution of at least the first defect indicator and the second defect indicator across the surface of the manufactured article.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
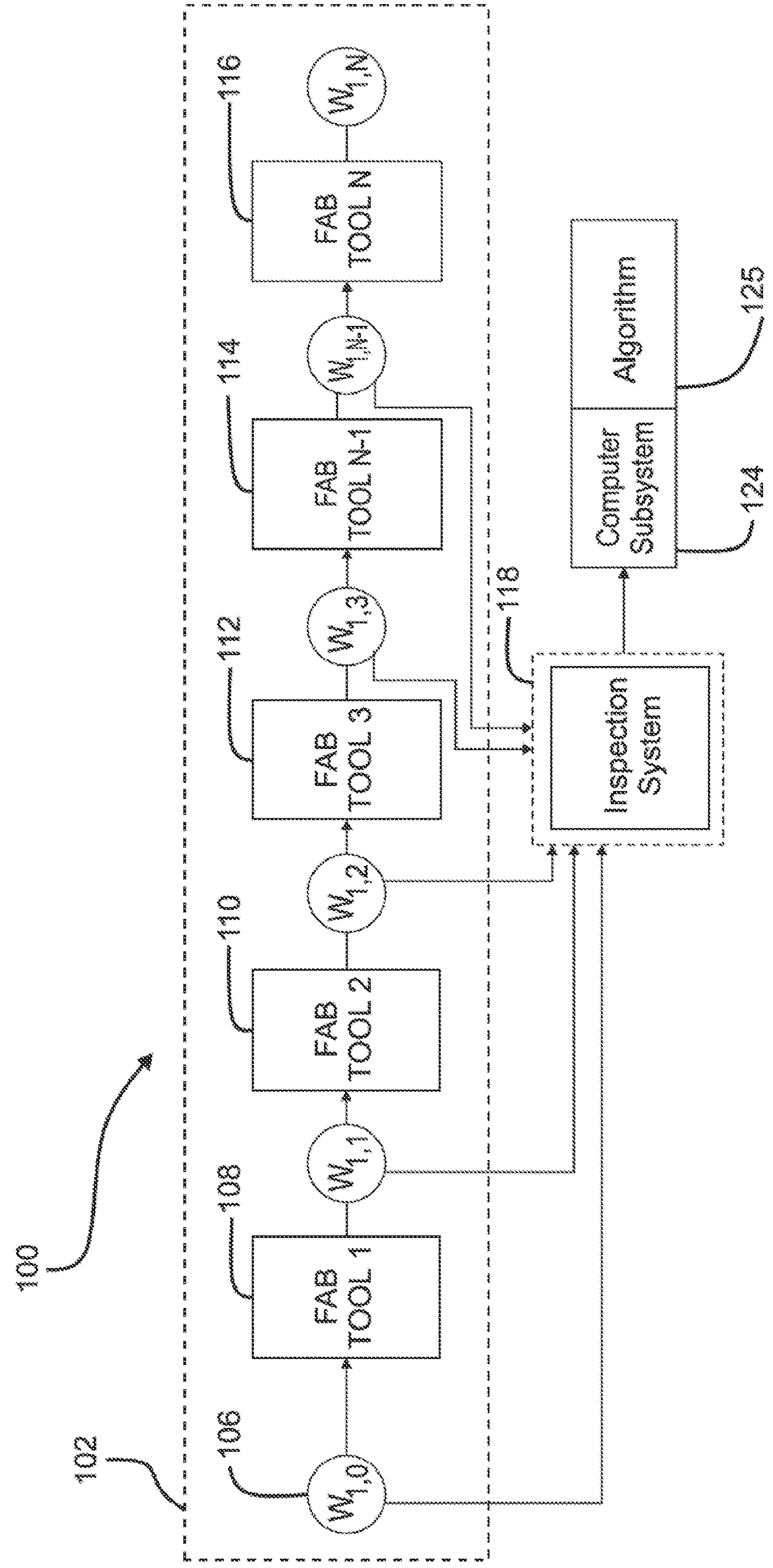
FIG. 1 is a schematic diagram depicting an adaptive manufacturing defect spatial recognition system, in accordance with an embodiment of the disclosure.

As discussed above, during manufactured article fabrication, the manufactured article undergoes many process steps that are performed by various tools. The tool or some other factor (such as manual handling of the manufactured article during the process) may cause one or more defects, such as a scratch or deposition of unwanted materials. For example, the defects may have a particular form or shape that may be reflective of the processor machine that caused the defect. Identifying a relationship between the form or shape of the defect in the process or tools used to create the article can help manufacturers to improve their yield rate and/or production quality. Conventionally, defect shapes are manually detected through visual observation. However, such visual observation is inefficient and manually intensive. In particular, a process engineer involved in the fabrication has to take time to analyze the process and patterns to figure out what went wrong, which can take substantial amounts of time.

To identify these defects, the manufactured article can be inspected using various inspection tools at different stages of the fabrication process. When the manufactured article is inspected, defects, along with the location of the defects, are recorded as defect data. These defects can be represented visually as a defect map of the manufactured article that shows the defect and the location of the defect on a representative image of the manufactured article. Based on the defect data and, in some examples, other inspection data, the type of defect can be determined from a pattern of defects. The pattern recognition process to recognize a type of defect is known as Spatial Pattern Recognition (SPR).

Examples of the present disclosure describe systems and methods for improving manufactured articles, including semiconductor substrate fabrication. In one aspect, the present technology relates to a system and method for identifying a tool or process causing defects in a manufactured article through various spatial pattern recognition (SPR) techniques. As used herein, a defect is a physical defect in or on a manufactured article. Although the specific examples of the adaptive manufacturing defect spatial pattern recognition system and method herein are described as being used to evaluate defects in a manufactured article such as a semiconductor wafer, reference to a wafer should not be considered limiting, as the system and method are equally applicable to other types of manufactured articles.

In one aspect, the inspection tool inspects a complete or incomplete manufactured article and generates a map (or defect map of the manufactured article based on the inspection data). The defect map can include a two-dimensional plot of potential defect indicators (e.g., data points) that may or may not be representative of an actual defect. The data points are then automatically detected and classified. Based on the classification, manufactured articles can be scrapped or kept as appropriate, and defect causing tools can be repaired and/or taken out of service as appropriate, optimizing overall fabrication yield. Automated classification according to the present disclosure can significantly speed up the yield optimization process.

More specifically, defect detection and classification employs adaptive spatial pattern recognition (SPR) and a machine learning model that associates specific patterns with specific defect types and/or tools. The SPR is adaptive to each generated defect map, which improves the accuracy of defect detection and defect classification outcomes. For example, as part of the SPR process, noise from the defect map is removed from the defect map based on factors that are specific to the defect map. As another example, as part of the SPR process, clustering within the defect map is performed based on factors specific to the defect map. Such factors can include, for example, the number, distribution (e.g., randomness), and/or skewness of the arrangement of potential defect indicators.

In one aspect, by adaptively removing noise and clustering, the defect map can be modified to identify the type of defect (e.g., scratch, tool mark, extraneous material, etc.), a location of the defect, and in some cases a probable cause of the defect. For example, in one aspect, artificial intelligence (AI) such as a trained machine learning model can receive the modified defect map as input and generate, as output, classifications for the defects, such as the defect type and/or the tool responsible for the defect.

FIG. 1 depicts a fabrication system 100, in accordance with an embodiment of the disclosure. In some embodiments, the fabrication system 100 can include multiple fabrication lines 102 for fabricating wafers or other manufactured articles. Each of the fabrication lines can include a plurality of fabrication tools. For example, the fabrication line 102 can include N fabrication tools, such as a first fabrication tool 108, a second fabrication tool 110, a third fabrication tool 112, an N−1 fabrication tool 114, and an Nth fabrication tool 116, where N is an integer greater than 1. The fabrication tools can include various types of fabrication tools used in the manufactured article fabrication process, such as oxidation systems, epitaxial reactors, diffusion systems, ion implantation equipment, physical vapor deposition systems, chemical vapor deposition systems, photolithography equipment, and etching equipment, among other types of tools. While only five fabrication tools are depicted in the fabrication line 102, fewer or more fabrication tools can be utilized. Fewer or more fabrication steps can also be performed, including hundreds of fabrication or processing steps in some examples.

A manufactured article 106 can be fabricated by proceeding through the fabrication line 102. Each of the fabrication tools 108, 110, 112, 114 and 116 can perform a process step on the manufactured article 106. In some examples, the manufactured article 106 can be processed by the same fabrication tool more than once. For instance, multiple deposition, lithography, and/or etching steps can be performed on the manufactured article 106. The manufactured article and its respective step can be represented with the following nomenclature: $W_{A,B}$, where A represents the manufactured article number and B represents the processing stage of the manufactured article. In the example depicted, the manufactured article 106 is represented by $W_{1,1}$ after the first processing step. After the second processing step, the first manufactured article 106 is represented by $W_{1,2}$.

After one or more processing steps are performed on the manufactured article 106, the manufactured article 106 is inspected by one or more inspection tool 118. The inspection tool 118 can include optical detection systems that capture images of the manufactured article and/or perform other optical or electrical testing on the manufactured article to identify defects, which in some embodiments can include a camera including suitable optics and an imager such as a CCD or CMOS chip.

In some embodiments, the inspection tool 118 can optionally include one or more lenses. For example, in some embodiments, the one or more lenses can serve to magnify an image of the manufactured article 106 (e.g., as part of a microscope). Additionally, in some embodiments the lenses can represent one or more filters or polarizers, employed for nuisance suppression to reduce the presence of certain electromagnetic wavelengths generally associated with observable features on a specimen that do not represent defects on the manufactured article 106.

The inspection tool 118 can utilize image capture, bright-field illumination, dark-field illumination, or a combination thereof for defect detection. The inspection tool 118 can also utilize electron beam (EB) imaging. Automatic Optical Inspection (AOI) defect and manufactured article probe defect inspection tools can also be utilized. Those having skill in the art will recognize additional inspection techniques and types of inspection tools.

The inspection tool 118 can also include metrology tools and/or manufactured article probe tools. The metrology tools and/or manufactured article tools can be combined with other types of inspection tools. The metrology tools can inspect the manufactured articles to determine or measure characteristics of the manufactured article, such as layer thicknesses, overlay characteristics, feature height, and/or critical dimensions, among other things as will be appreciated by those having skill in the art.

Accordingly, in embodiments, the inspection tool 118 can include various types of imaging systems configured to capture different perspectives of the manufactured article 106. For example, in some embodiments, the inspection tool 118 can include a camera configured to capture images represented by light across a broad range of the electromagnetic spectrum (e.g., visible light, ultraviolet light, x-ray, infrared light, etc.). In some embodiments, the inspection tool 118 can include a scanning electron microscope, acoustical imaging device, ultrasound imaging device, or the like.

As further depicted in FIG. 1, in some embodiments, the system 100 can incorporate the inspection tool 118, such that inspection via the inspection tool 118 is seamlessly integrated into the manufacturing process, which in some embodiments may include one or more rework processes to address defects discovered by the system 100. The manufactured article data generated by the inspection tool 118 can generally be referred to as inspection data, which can include defect data, manufactured article probe data, and metrology data. For instance, the inspection tool 118 can be configured to capture defects and the locations of the defects on the manufactured article 106 to generate the inspection data.

Thereafter, in some embodiments, an image processor (e.g., as part of computer subsystem 124) can be configured to combine the multiple images captured by the inspection tool 118 into a combined or stacked article defect map, wherein the defects observed on a plurality of manufactured articles are collectively represented in a single image. In some embodiments, the image can be referred to as a virtual or synthetic image, where the terms virtual or synthetic mean that the image is an electronic representation of a physical sample or a collection of real-world, physical samples.

The inspection data can then be input into an inspection data processing algorithm 125, for example via a computer system or components executed by a computer subsystems 124, to analyze the inspection data for defect spatial recognition (e.g., chip, crack, scratch, particles, etc.) imparted on the manufactured article 106 during the manufacturing process. In some embodiments, the output can be in terms of a statistical probability in the form of a percentage or likelihood of the presence of a manufacturing defect. In other embodiments, the output can be in the form of an image, wherein the image indicates the probability of the presence of a manufacturing defect on the surface of the manufactured article 106. The output can also be a series of outputs representing a number of user-defined types or classifications of defects, where the outputs are a numerical probability. In some embodiments, above a certain threshold indicates that a defect is present and/or the type of defect that is present.

In some embodiments, the algorithm 125 can utilize artificial intelligence (AI) such as one or more trained machine learning models (e.g., neural network, etc.). For instance, the input to the machine learning model can be the inspection data for the manufactured article 106. The output of the machine learning model can be the defect type and/or the particular tool and/or process that caused the defect.

Figure 2:
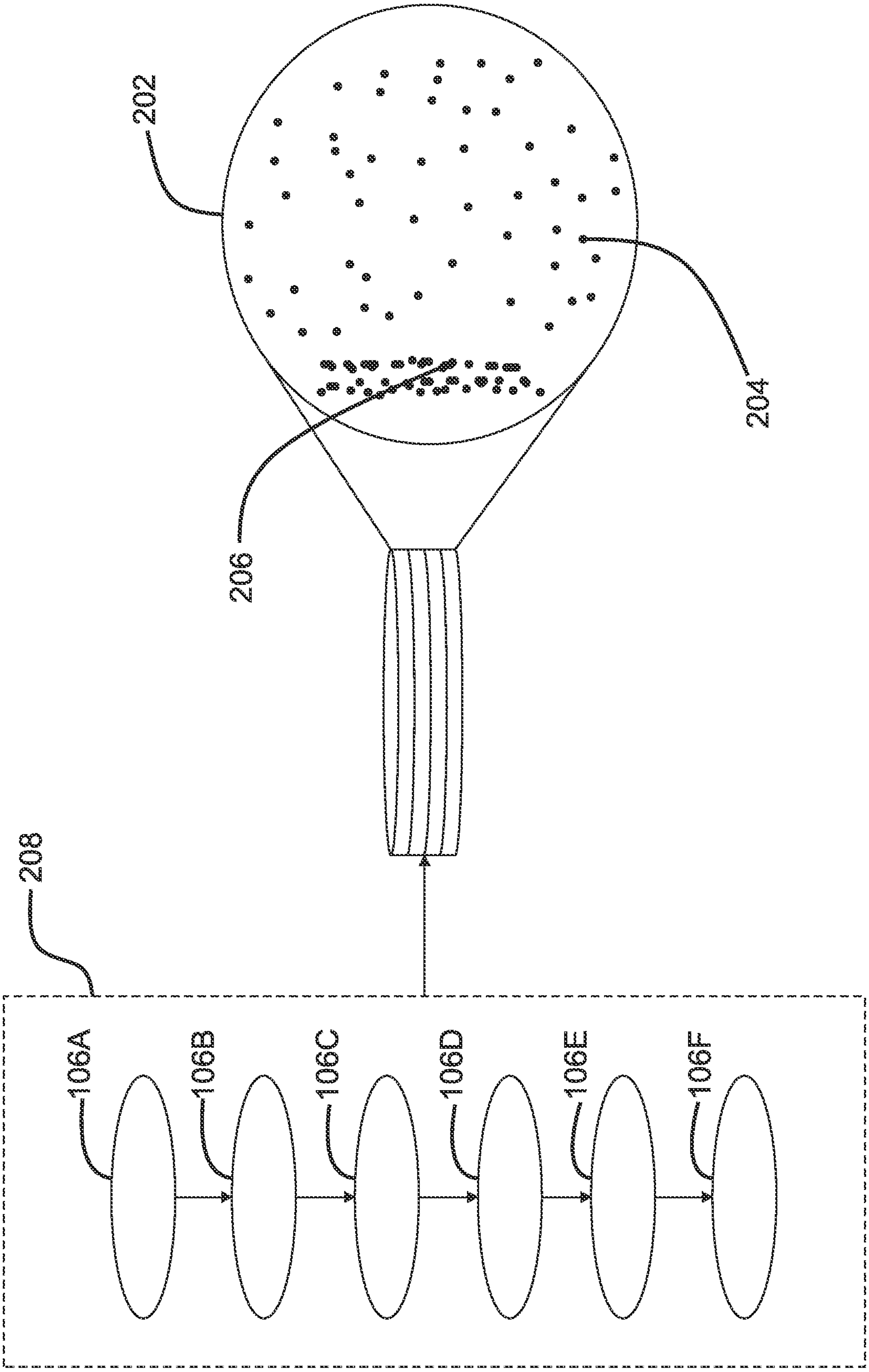
FIG. 2 is a schematic diagram depicting the creation of a manufactured article defect map, in accordance with an embodiment of the disclosure.

Referring to FIG. 2, a manufactured article defect map 202 including inspection data of a plurality of manufactured articles 106A-F is depicted in accordance with an embodiment of the disclosure. The example defect map 202 includes a plurality of defect indicators 204. The defect indicators 204 can indicate the location of individual defects. The defect indicators 204 can also have a color or other display feature that indicates additional detail about a particular defect, such as intensity of a defect, size of the defect, whether the defect is on the surface of the manufactured article, and/or whether the defect is below the surface of the manufactured article. Such details about a particular individual defect may be referred to as individual defect attributes or details.

The defects may form in defect groupings 206 on the manufactured article. The defect groupings 206 may form different patterns, such as patterns that are recognized by SPR and the technology discussed herein. In the example defect map 202 shown in FIG. 2, the identified defect grouping 206 is indicative of a scratch. For instance, as can be seen from the defect grouping 206, a line or curve is formed that appears to be a scratch. Based on the inspection data for the manufactured article corresponding to the example manufactured article map 202, the set of tools and/or processes that generated the scratch is known. Using the technology disclosed herein, the particular tools and/or processes that generated the scratch can be identified.

In some instances, the defect pattern in a single manufactured article map may be faint, which can make pattern recognition difficult. To help alleviate this issue, the present technology is able to amplify the pattern to allow for better pattern recognition. For example, the present technology can "stack" the defect or manufactured article maps from multiple manufactured articles that were processed by the same tool or set of tools. For instance, all defects from a group of manufactured articles 106A-F processed by the inspection tool 118 may be added together and represented in a single manufactured article map, referred to as a stacked manufactured article map 202, representing an electronic representation of a single manufactured article (e.g., a virtual manufactured article map, etc.) including all of the defects observed on a plurality of manufactured articles. In other embodiments, the manufactured article map 202 can represent the defects observed on a single manufactured article.

For example, a set of manufactured article maps 208 are accessed or received, which can include a manufactured article map for each of the plurality of manufactured articles 106A-F. While six manufactured article maps are depicted as being included in the set of manufactured article maps 208, it should be appreciated that a fewer or greater number of manufactured article maps may be included in the set of manufactured article maps 208.

The set of manufactured article maps 208 may include only manufactured article maps from a specific fabrication stage for each respective manufactured article. For example, at a particular fabrication stage in a fabrication line, a manufactured article may be inspected, and a manufactured article map may be generated for that time point. The set of manufactured article maps 208 is made up of manufactured article maps all generated at that fabrication stage or point in time and processed by the same tools. The set of manufactured article maps 208 may be selected based on the manufactured articles being processed by a particular tool or process. Accordingly, if a signature mark is being left by a specific fabrication tool in the fabrication line, all (or many) manufactured articles processed by that tool should include at least a portion of that signature mark, albeit faint in some cases.

The set of manufactured article maps 208 can be additively combined to form the manufactured article map 202. For instance, the defects from each of the manufactured article maps in the set of manufactured article maps 208 are added to a single manufactured article map referred to as the manufactured article map 202. Collectively, the defect indicators 204 can indicate the number of defects at that particular location in the set of manufactured article maps 208. In some examples, the manufactured article map 202 can be represented as a heat map based on the number of defect indicators 204 at a particular location across all the manufactured article maps in the set of manufactured article maps 208. The underlying inspection data representing the manufactured article map 202 may also indicate the defect count for each location of the manufactured article.

By adding the defects from the set of manufactured article maps, the patterns of defect groupings 206 may become more apparent. For example, a defect grouping 206 may become more apparently a scratch, arc, ring, tool mark, or other shapes and patterns as will be recognized by those having skill in the art. Thus, defect patterns and the root causes of those defects may be identified more quickly or sooner than using a single manufactured article map, and future defects can be prevented more quickly. However, an increase in noise may also occur. As such, filters may be applied to the manufactured article map 202 to remove, or apply a lesser weight to, defects that infrequently occur in the set of manufactured article maps 208. The manufactured article map 202 may also be used in generating signature marks for particular tools used in fabrication of the manufactured articles 106.

A first manufactured article map 202 based on a first set of manufactured article maps 208 may be compared to another or second manufactured article map based on second set of manufactured article maps to determine a pattern trend. For instance, the first manufactured article map may be generated from manufactured article maps that passed through a set of fabrication tools first (e.g., manufactured articles 106A, 106B, 106C, etc.). The second manufactured article map may be generated from manufactured article maps that passed through the set of fabrication tools second (e.g., manufactured articles 106D, 106E, 106F, etc.). If a defect grouping in the first manufactured article map weakly indicates a particular defect type and/or a particular root cause, but a defect grouping the second manufactured article map more strongly indicates the particular defect type and/or particular root cause, a determination may be made that a tool and/or process is degrading and beginning to cause more serious (or more frequent) defects on the manufactured articles.

While the manufactured article map 202 is formed from defect maps indicating the location of individual defects on the manufactured article, manufactured article probe data and/or metrology data may also be used to form manufactured article maps. Metrology data may be similarly used to form a manufactured article map. For example, the metrology data may be represented as a gradient of a measured value across the manufactured article. Those gradient representations, or gradient manufactured article maps, may be stacked (e.g., additively combined) to form a manufactured article map representing the metrology data for manufactured articles at the same fabrication stage or point in time and processed by the same tools. In some examples, the manufactured article map may include a combination of two or more of the defect data, the manufactured article probe data, and/or the metrology data.

Figure 3:
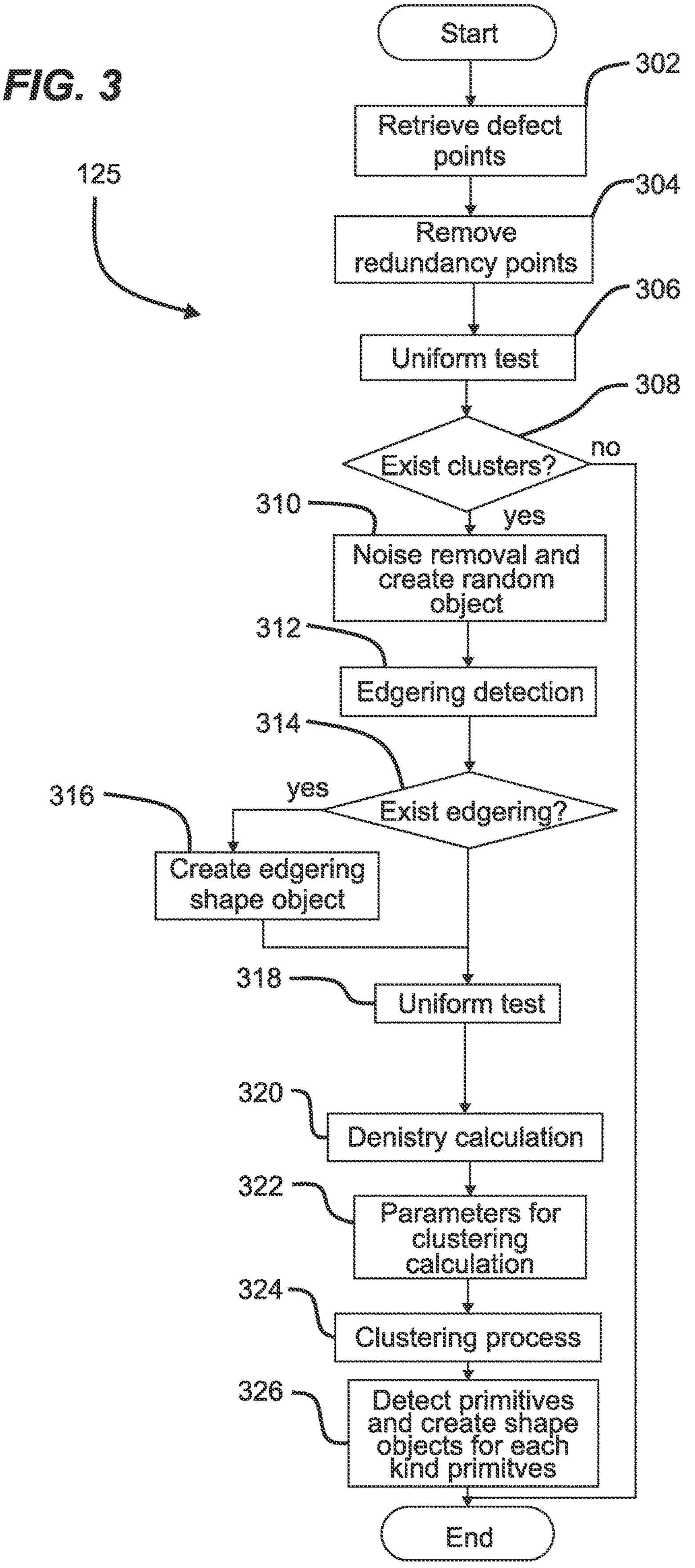
FIG. 3 is a flowchart depicting an inspection data processing algorithm, in accordance with an embodiment of the disclosure.

Referring to FIG. 3, an example algorithm 125 configured to identify a tool or process causing defects in a manufactured article through various spatial pattern recognition techniques, is depicted in accordance with an embodiment of the disclosure. As shown, the algorithm 125 can include a plurality of sub-components or steps, including removing redundancy points, performing a randomness or uniform test, parameter estimation, noise removal, clustering, and shape detection, among other subcomponents or steps. The shape detection algorithm component or step can include several sub-components, including, for example, edge ring detection, least square detection, Hough line detection, histogram baseline detection, arc detection, blob detection, etc.

Figure 4A:
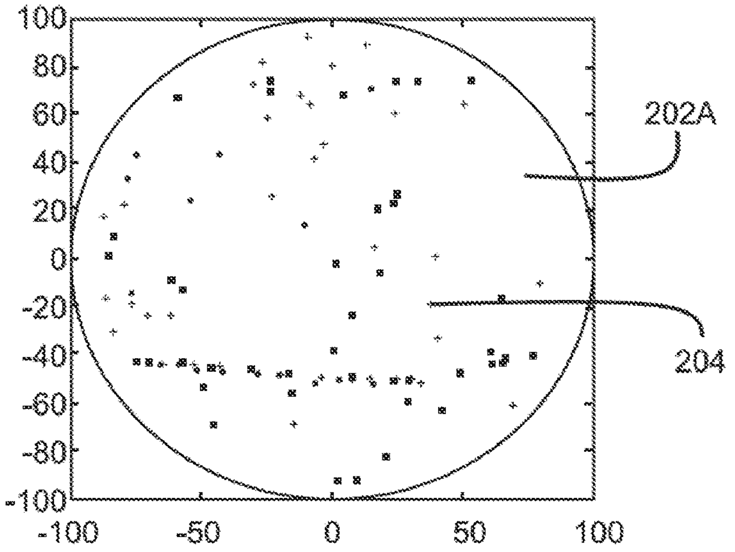
FIG. 4A is a representation of a manufactured article map including inspection data gathered by an inspection tool from a plurality of manufactured articles, in accordance with an embodiment of the disclosure.

The algorithm 125 can include a subcomponent or step of retrieving defect points, at 302. In particular, step 302 can represent receiving inspection data generated by the inspection tool inspecting a semiconductor substrate, from which a manufactured article map including an arrangement of potential defect indicators can be generated. For example, with additional reference to FIG. 4A, the retrieved defect points can be in the form of a manufactured article map 202A, which can represent a collection of the defect indicators 204 from a combined set of manufactured article maps 208 generated by the inspection tool 118 on a plurality of manufactured articles 106A-F from fabrication line 102. In other embodiments, the manufactured article map 202A can represent the defect indicators 204 present on a single manufactured article 106.

At 304, redundant defects can be removed. In some embodiments, each defect indicator 204 from each manufactured article map of the set of manufactured article maps 208 can include coordinate data indicating the position of each defect indicator 204 on the manufactured article 106 (e.g., relative to a fixed data reference point). For example, in some embodiments, each manufactured article map of the set of manufactured article maps 208 can be in the form of a digital image, wherein the location of each pixel within the digital image is representative of the location. Where a particular defect is present on multiple maps of the set of manufactured article maps 208 at a particular pixel location, the multiple defects observed on multiple specimens can be collapsed into a single defect indicator 204 for presentation on the manufactured article defect map 202. In some embodiments, the defect indicator 204 can include an intensity component, indicating that although the defect indicator 204 appears as a single point on the manufactured article defect map 202, the underlying inspection data representing the defect indicator 204 was present on a plurality of manufactured articles 106.

At 306, a uniform test can be performed on the defect indicators 204 of the manufactured article defect map 202. The uniform test 306 can generally test the uniformity of distribution of the defect indicators 204 across the manufactured article defect map 202. In particular, the uniform test 306 can determine whether the distribution of the defect indicators 204 in the manufactured article defect map 202 significantly differ from a uniform distribution. Where it is determined that the distribution of the defect indicators 204 differ from a uniform distribution, at the step 308, the existence of clusters can be inferred. If the defect indicators 204 are uniformly distributed within the manufactured article defect map 202, the algorithm 125 can indicate that no clusters of defect indicators 204 exist, and therefore any defects present in the manufactured articles 106 are random and not generally caused by a fabrication tool.

By contrast, where it is determined that a cluster of defect indicators 204 does exist, the algorithm 125 can proceed to noise removal, at 310. In some embodiments, noise in terms of spatial pattern recognition is defined as any defect indicator 204 wherein its nearest neighboring defect indicator is greater than a certain distance ($d_{th}$). The distance ($d_{th}$) can be determined by the total number of defect indicators 204 and the distribution of the defect indicators 204 on the manufactured article defect map 202. Once the distance ($d_{th}$) is determined, all defect indicators 204 that meet the noise definition can be removed. The distance can be an adaptive distance unique to each defect map.

Other methods of noise removal may be employed in certain embodiments. For example, in some embodiments, the algorithm 125 can be configured to determine a distribution zone for each defect indicator 204, wherein if at least N number of other defect indicators do not fall within the distribution zone (where N is an integer greater than 1), then the defect indicator 204 is determined to be noise and subsequently removed.

Figure 4B:
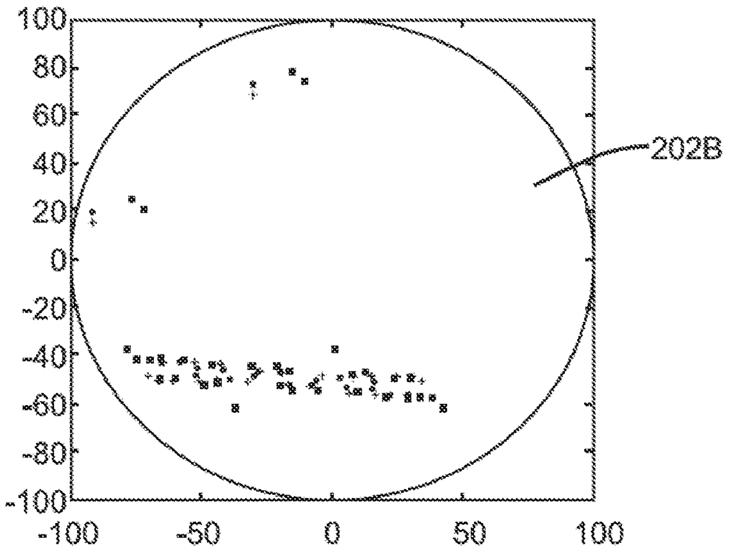
FIG. 4B is the manufactured article map of FIG. 4A, in which defect indicators determined by the inspection data processing algorithm to be noise have been removed, in accordance with an embodiment of the disclosure.

Specifically, step 310 can involve calculating a distance between a pair of potential defect indicators, and removing, based on the distance, a subset of the potential defect indicators from the arrangement to generate a modified defect map. FIG. 4B depicts one example of a manufactured article defect map 202B following noise removal at step 310.

At step 312, the remaining defect indicators 204 can be statistically analyzed to determine whether they can be grouped into a cluster, or otherwise identified as a signature mark. For example, as depicted in FIG. 3, subcomponent or step 312 is referred to as edge ring detection, which attempts to group a portion of the remaining defect indicators 204 into an identified arc or ring shape. Other types of clustering and shape detection subcomponents and methods are also contemplated.

At step 314, a determination can be made as to whether at least a portion of the remaining defect indicators 204 can be properly grouped into a cluster. If the defect indicators 204 can be grouped, at step 316, a pattern recognition of the signature marks can be added to the manufactured article defect map 202, thereby potentially indicating the source of the defects in the manufacturing process. Conversely, if the defect indicators 204 cannot be grouped, at the step 318 a subsequent uniform test can be performed under new parameters, wherein the uniform test compares the distribution of the remaining defect indicators 204 across the manufactured article defect map 202 to a uniform distribution. At the step 320 a density of the remaining defect indicators 204 can be computed, which at the step 322 can be used to establish new parameters for clustering calculations.

At step 324, a clustering subcomponent or step can be applied. In some embodiments, the spatial pattern recognition can employ density-based clustering; however unlike other density clustering algorithms, the clustering subcomponent or step 324 can avoid the use of single or multiple hard-coded thresholds. Rather, in embodiments, the clustering thresholds utilized by the clustering subcomponent or step 324 can be calculated dynamically. The clustering thresholds can be determined by a number of factors, including the total number of defect indicators 204, distribution randomness of the defect indicators 204, density of the defect indicators 204, skewness of the defect indicators 204, etc. In some embodiments, clustering thresholds can change from one defect map to another. Based on factors given, the algorithm 125 can automatically and dynamically calculate appropriate clustering thresholds for a particular manufactured article defect map 202, also referred to herein as a "dynamic threshold."

In some embodiments, the dynamic threshold can be computed based on the merge criteria between two defect indicators 204, represented by the following function:

$$d_{ij} = le^{\frac{S_h}{S_l{}^{\alpha}}} \tag{1}$$

where $d_{ij}$ denotes the distance between two defect indicators 204, l is the 2-norm distance of defect indicators i and j, $S_h$ is the higher kernel density between defect indicator i and defect indicator j, $S_l$ is opposite; and a is a factor to control the density effect. Accordingly, if $d_{ij}$<threshold, the two defect indicators 204 can be merged into a single defect grouping 206 of the manufactured article defect map. Thus, as du increases, the probability of merging any two defect indicators into a defect grouping 206 decreases.

At 326, the algorithm 125 can create or assign one or more pattern of defect indicators to a defect grouping 206. For example, in some embodiments, shape identification subcomponent or step 326 can employ one or more line or curve fitting methods used to fit a cluster of defect indicators 204 to a line, polynomial, arc, ring, or the like. In some embodiments, shape identification subcomponent or step 326 can group a cluster of defect indicators 204 into a shape (e.g., a geometrical shape, asymmetrical shape, etc.) defined by a closed loop path. For example, in some embodiments, the algorithm 125 can attempt to fit the defect indicators 204 of a defect grouping 206 to a line equation. If the standard deviation of the defect indicators 204 exceeds a predetermined threshold, the algorithm 125 can attempt to fit the defect indicators 204 to a polynomial equation, representative of a curved scratch or arc. Hough-based methods can be suitable for defect groupings 206 that may include more than a single line. Additionally, a histogram-based line detection method can be used to distinguish between the multiple lines.

Figure 4C:
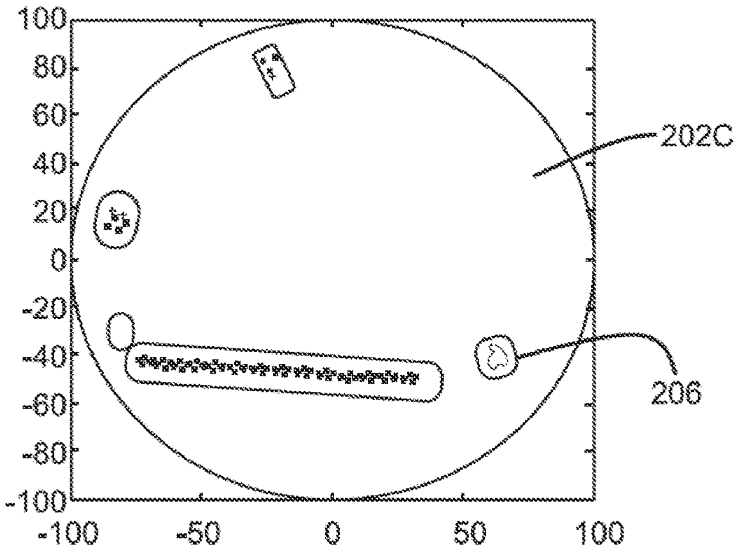
FIG. 4C is the manufactured article map of FIG. 4B, in which the remaining defect indicators have been linked to discrete defect groupings indicative of a defect taking place during fabrication of the manufactured articles, in accordance with an embodiment of the disclosure.

Accordingly, as depicted in FIG. 4C, the remaining defect indicators have been linked to discrete defect groupings indicative of a defect taking place during fabrication of the manufactured articles. Thus, in some embodiments, steps 324 and 326 can involve recognizing, with the machine learning model, the defect in the modified defect map, and classifying the defect, including determining a type of defect and/or tool that caused the defect.

In some embodiments, the algorithm 125 can employ machine learning to aid in identification of patterns or objects created by the defect groupings 206. In some embodiments, the output of the algorithm 125 can be in terms of a statistical probability in the form of a percentage or likelihood of the presence of an identified defect pattern. In other embodiments, the output can be in the form of an image, wherein the image indicates the shape of a defect to fabrication tool signature mark on the surface of the manufactured article 106.

Neural networks typically including multiple layers, with a signal path that traverses from front to back. The multiple layers perform a number of algorithms or transformations. In general, the number of layers is not significant and is use case dependent. For practical purposes, a suitable range of layers is from two layers to a few tens of layers. Modern neural network projects typically work with a few thousand to a few million neural units and millions of connections. The goal of the neural network is to solve problems in the same way that the human brain would, although several neural networks are much more abstract. The neural networks may have any suitable architecture and/or configuration known in the art. In some embodiments, the neural networks may be configured as a deep convolutional neural network (DCNN).

The neural networks described herein belong to a class of computing commonly referred to as machine learning. Machine learning can be generally defined as a type of artificial intelligence (AI) that provides computers with the ability to learn without being explicitly programmed. Machine learning focuses on the development of computer programs that can teach themselves to grow and change when exposed to new data. In other words, machine learning can be defined as the subfield of computer science that "gives computers the ability to learn without being explicitly programmed." Machine learning explores the study and construction of algorithms that can learn from and make predictions on data-such algorithms overcome following strictly static program instructions by making data driven predictions or decisions, through building a model from sample inputs.

The neural networks described herein may also or alternatively belong to a class of computing commonly referred to as deep learning (DL). Generally speaking, "DL" (also known as deep structured learning, hierarchical learning or deep machine learning) is a branch of machine learning based on a set of algorithms that attempt to model high level abstractions in data. In a simple case, there may be two sets of neurons: ones that receive an input signal and ones that send an output signal. When the input layer receives an input, it passes on a modified version of the input to the next layer. In a based model, there are many layers between the input and output (and the layers are not made of neurons but it can help to think of it that way), allowing the algorithm to use multiple processing layers, composed of multiple linear and non-linear transformations.

DL is part of a broader family of machine learning methods based on learning representations of data. An observation (e.g., an image) can be represented in many ways such as a vector of intensity values per pixel, or in a more abstract way as a set of edges, regions of particular shape, etc. Some representations are better than others at simplifying the learning task (e.g., face recognition or facial expression recognition). One of the promises of DL is replacing handcrafted features with efficient algorithms for unsupervised or semi-supervised feature learning and hierarchical feature extraction.

Research in this area attempts to make better representations and create models to learn these representations from large-scale unlabeled data. Some of the representations are inspired by advances in neuroscience and are loosely based on interpretation of information processing and communication patterns in a nervous system, such as neural coding which attempts to define a relationship between various stimuli and associated neuronal responses in the brain.

Figure 5A:
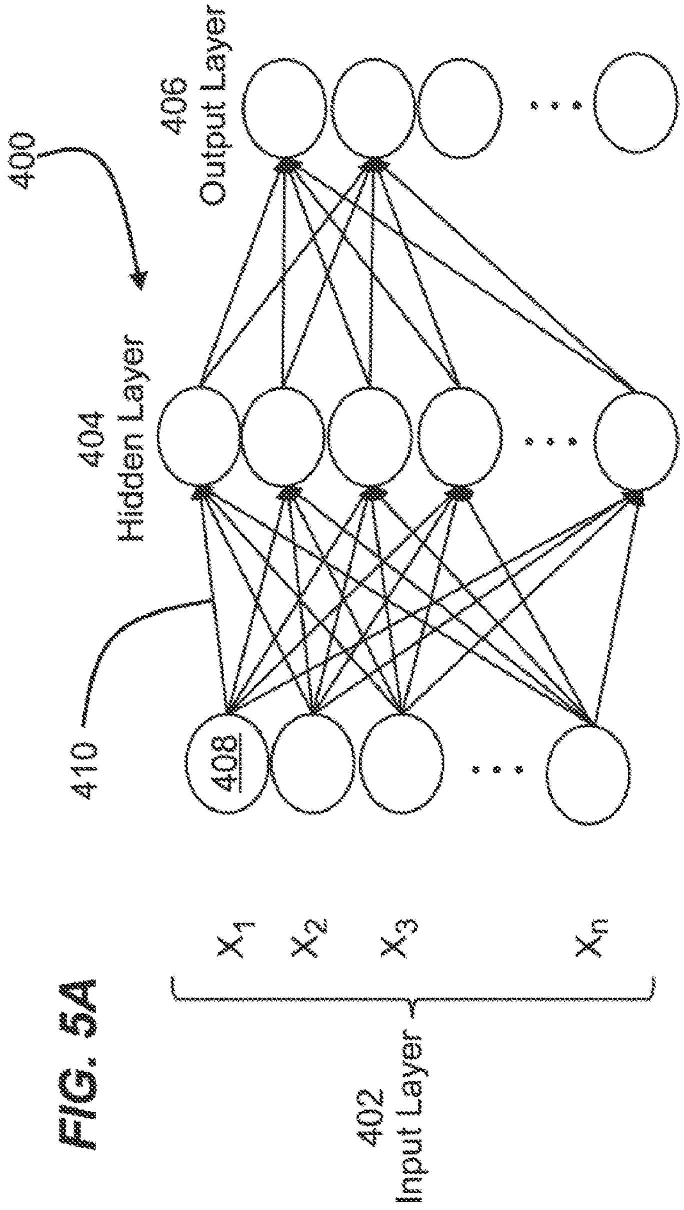
FIG. 5A is a schematic diagram depicting an inspection data processing neural network, in accordance with an embodiment of the disclosure.
Figure 5B:
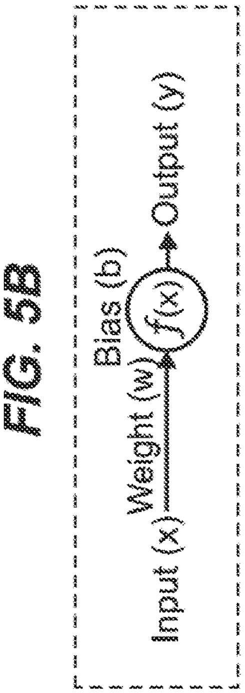
FIG. 5B depicts a single neuron within the neural network of FIG. 5A, in accordance with an embodiment of the disclosure.

With additional reference to FIGS. 5A-5B, at a basic level, the neural network 400 can include an input layer 402, one or more hidden layers 404, and an output layer 406. Each of the layers 402, 404, and 406 can include a corresponding plurality of neurons 408. Although only a single hidden layer 404 is depicted, it is contemplated that the neural network 400 can include as few as one hidden layer or as many hidden layers as desired.

The inputs for the input layer can be any number along a continuous range (e.g., any number between 0 and 1, etc.). For example, in one embodiment, the input layer 402 can include a total of 786,432 neurons corresponding to a 1024×768 pixel output of the inspection tool 118, wherein each of the input values (e.g., based on a grayscale or RGB color code). In another embodiment, the input layer 402 can include three layers of inputs for each pixel, wherein each of the input values is based on a numerical color code for each of the R, G, and B colors; other quantities of neurons and input values are also contemplated.

Each of the neurons 408 in a given layer (e.g., input layer 402) can be connected to each of the neurons 408 of the subsequent layer (e.g., hidden layer 404) via a connection 410, as such, the layers of the network can be said to be fully connected. Although it is also contemplated that the algorithm can be organized as a convolutional neural network, wherein a distinct group of input layer 402 neurons (e.g., representing a local receptive field of input pixels) can couple to a single neuron in a hidden layer 404 via a shared weighted value.

With additional reference to FIG. 5B, each of the neurons 408 can be configured to receive one or more input values (x) and compute an output value (y). In fully connected networks, each of the neurons 408 can be assigned a bias value (b), and each of the connections 410 can be assigned a weight value (w). Collectively the weights and biases can be tuned as the neural network 400 learns how to correctly classify detected objects. Each of the neurons 408 can be configured as a mathematical function, such that an output of each neuron 408 is a function of the connection weights of the collective input, and the bias of the neuron 408, according to the following relationship:

$$y \equiv w \cdot x + b \quad (2)$$

In some embodiments, output (y) of the neuron 408 can be configured to take on any numerical value (e.g., a value of between 0 and 1, etc.). Further, in some embodiments the output of the neuron 408 can be computed according to one of a linear function, sigmoid function, tan h function, rectified linear unit, or other function configured to generally inhibit saturation (e.g., avoid extreme output values which tend to create instability in the neural network 400).

In some embodiments, the output layer 406 can include neurons 408 corresponding to a desired number of outputs of the neural network 400. For example, in one embodiment, the neural network 400 can include a plurality of output neurons dividing the surface of the manufactured article 106 into a number of distinct regions in which the likelihood of the presence of a defect can be indicated with an output value. Other quantities of the output layer 406 are also contemplated; for example, the output neurons could correspond to object classifications (e.g., comparison to a database of historical images), in which each output neuron would represent a degree of likeness of the present image to one or more historical images of a known fabrication tool signature mark.

Figure 6:
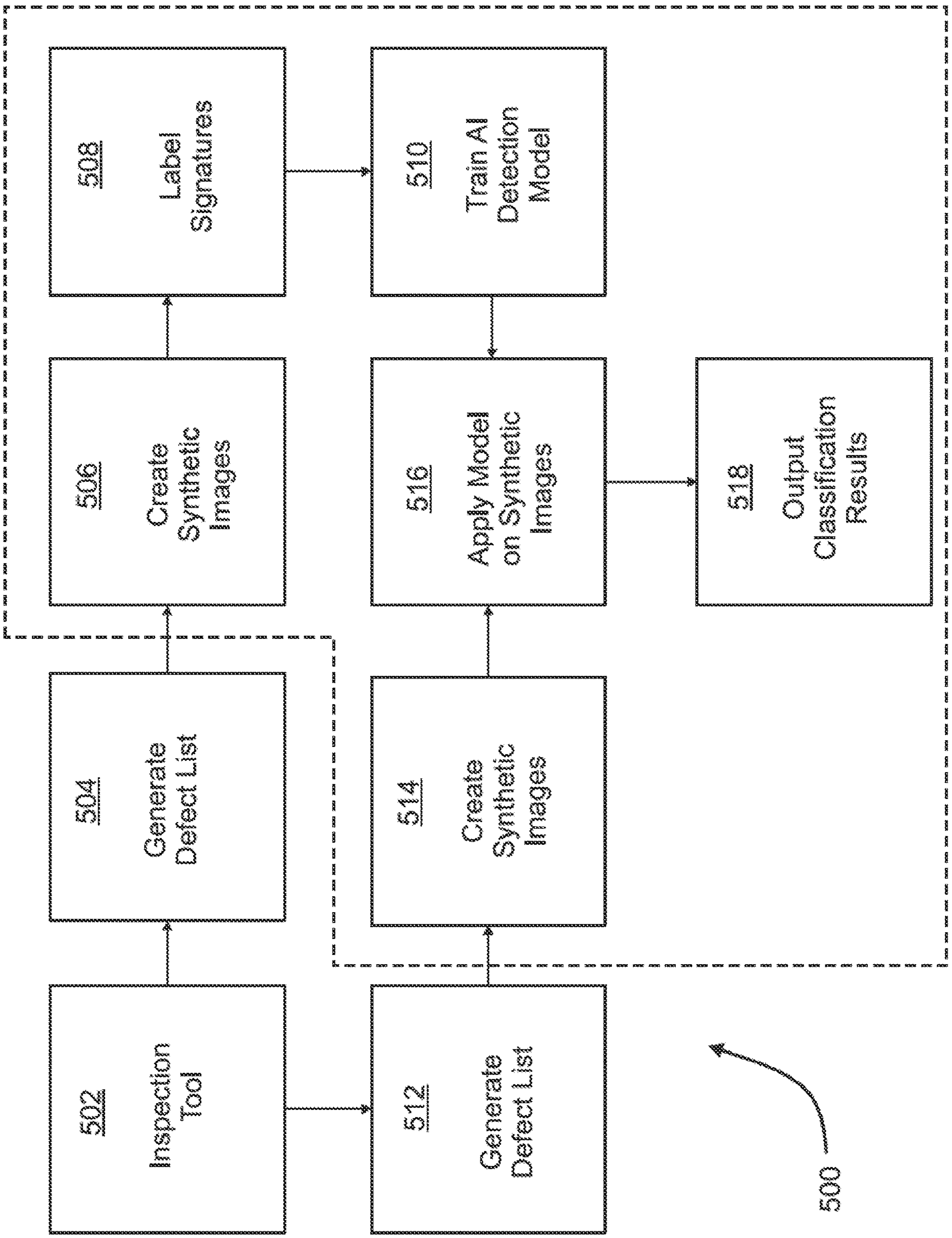
FIG. 6 is a flowchart depicting a method of training and using a neural network for adaptive manufacturing defect spatial pattern recognition, in accordance with an embodiment of the disclosure.

With additional reference to FIG. 6, a flowchart depicting a method of training and using a neural network for adaptive manufacturing defect spatial pattern recognition 500 is depicted in accordance with an embodiment of the disclosure. At step 502, the inspection tool 118 can be used to gather inspection data on a plurality of manufactured articles 106. At step 504, the inspection data can be compiled to create an electronic representation of the plurality of manufactured articles (at step 506), for example in the form of a manufactured article map 202 (as depicted in FIG. 2). At step 508, the algorithm 125 (as depicted in FIG. 3) can be used to create label signatures indicative of the types of defects clustered into the defect groupings 206. In particular, in some embodiments, the algorithm 125 can compute a dynamic threshold based on the merge criteria between two defect indicators to determine a probability that any two defect indicators 204 can be grouped into a defect grouping 206.

At step 510, the manufactured article map 202 including the label signatures can be used as training data to train the neural network 400. The goal of the deep learning algorithm is to tune the weights and balances of the neural network 400 until the inputs to the input layer 402 are properly mapped to the desired outputs of the output layer 406, thereby enabling the algorithm to accurately produce outputs (y) for previously unknown inputs (x). For example, if the inspection tool 118 captures a digital image of a manufactured article 106 (the pixels of which are fed into the input layer 402), a desired output of the neural network 400 can be the indication of whether the gathered inspection data include defect indicators 204 generally forming one or more defect groups 206 having a particular form or shape indicative of a problem experienced during fabrication. In some embodiments, the neural network 400 can rely on training data (e.g., inputs with known outputs) to properly tune the weights and balances.

In tuning the neural network 400, a cost function (e.g., a quadratic cost function, cross entropy cross function, etc.) can be used to establish how close the actual output data of the output layer 406 corresponds to the known outputs of the training data. Each time the neural network 400 runs through a full training data set can be referred to as one epoch. Progressively, over the course of several epochs, the weights and balances of the neural network 400 can be tuned to iteratively minimize the cost function.

Effective tuning of the neural network 400 can be established by computing a gradient descent of the cost function, with the goal of locating a global minimum in the cost function. In some embodiments, a backpropagation algorithm can be used to compute the gradient descent of the cost function. In particular, the backpropagation algorithm computes the partial derivative of the cost function with respect to any weight (w) or bias (b) in the neural network 400. As a result, the backpropagation algorithm serves as a way of keeping track of small perturbations to the weights and biases as they propagate through the network, reach the output, and affect the cost. In some embodiments, changes to the weights and balances can be limited to a learning rate to prevent overfitting of the neural network 400 (e.g., making changes to the respective weights and biases so large that the cost function overshoots the global minimum). Additionally, in some embodiments, various methods of regularization, such as L1 and L2 regularization, can be employed as an aid in minimizing the cost function.

As the neural network 400 is tuned to correspond to the training data, the weights and biases of the neural network are gradually tuned to account for all of the processes performed on the inspection data during the training phase, including determining a probability of grouping any two defect indicators into a single defect grouping according to a dynamic threshold.

With continued reference to FIG. 6, with the neural network 400 tuned, at 512, the inspection tool 118 can be used to gather inspection data on a plurality of manufactured articles 106. At 514, the inspection data can be compiled to create an image of the one or more manufactured articles. Thereafter, at 516, the neural network 400 can be applied on the synthetic image, with the goal of outputting classification results, at 518, indicative of errors detected during the fabrication of the manufactured articles 106.

Figure 7A:
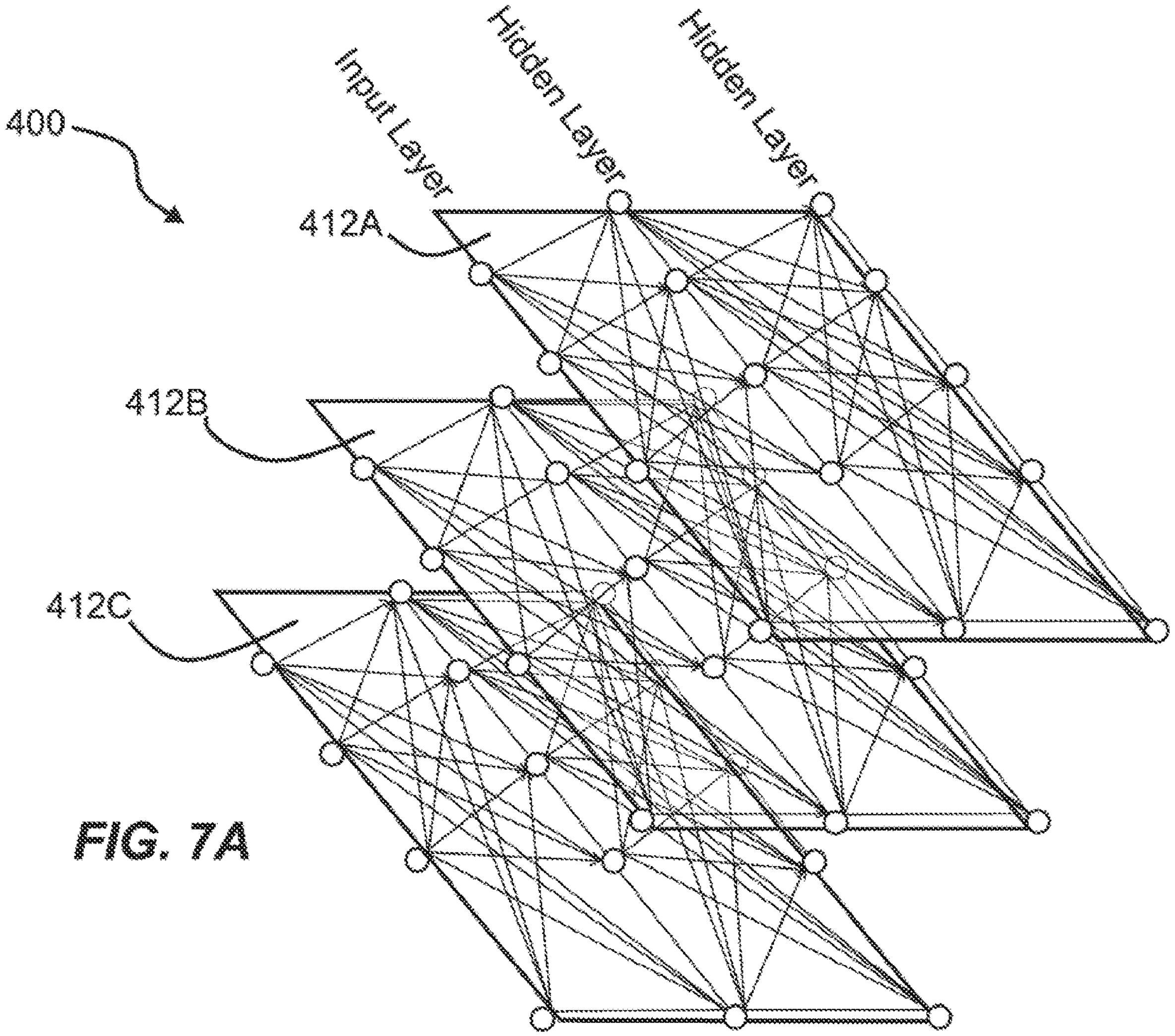
FIG. 7A is a schematic diagram depicting a multi-channel inspection data processing neural network, wherein each channel of the multichannel inspection data processing neural network is configured to simultaneously analyze inspection data from a single manufactured article or other manufactured article, in accordance with an embodiment of the disclosure.
Figure 7B:
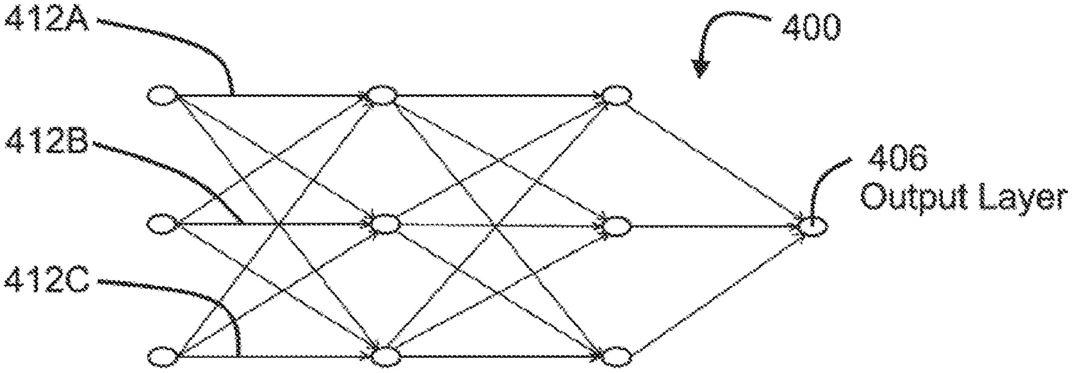
FIG. 7B is a profile view depicting the multi-channel inspection data processing neural network of FIG. 7A.

With additional reference to FIGS. 7A-7B, in some embodiments, the neural network 400 can include a plurality of channels 412A-C, with each channel 412A-C representing a distinct input layer 402 configured to receive inspection data associated with each manufactured article 106A-F. As best depicted in FIG. 7A, the neurons 408 in each of the channels 412A-C of a given layer (e.g., input layer 402) can be connected to each of the neurons 408 of the subsequent layer (e.g., hidden layer 404) via connections 410, such that each of the channels 412A-C are fully connected to one another, with the final hidden layer 404 optionally feeding into a single output layer 406 indicating the defect groupings 206 (including the shape or form of the groupings), which can be traced back to steps during the fabrication process.

Accordingly, in some embodiments, the fabrication system 100 be configured to utilize pixel data from the inspection tool 118 as an input for a computer subsystem 124 or components executed by computer subsystems configured to operate a deep learning algorithm for the purpose of evaluating defects in a semiconductor manufactured article or other manufactured article. Although the present disclosure specifically discusses the use of a deep learning algorithm in the form of a neural network 400 to establish clustering and shape fitting to perceived defects, other methods of automatic recognition and classification are also contemplated.

Figure 8:
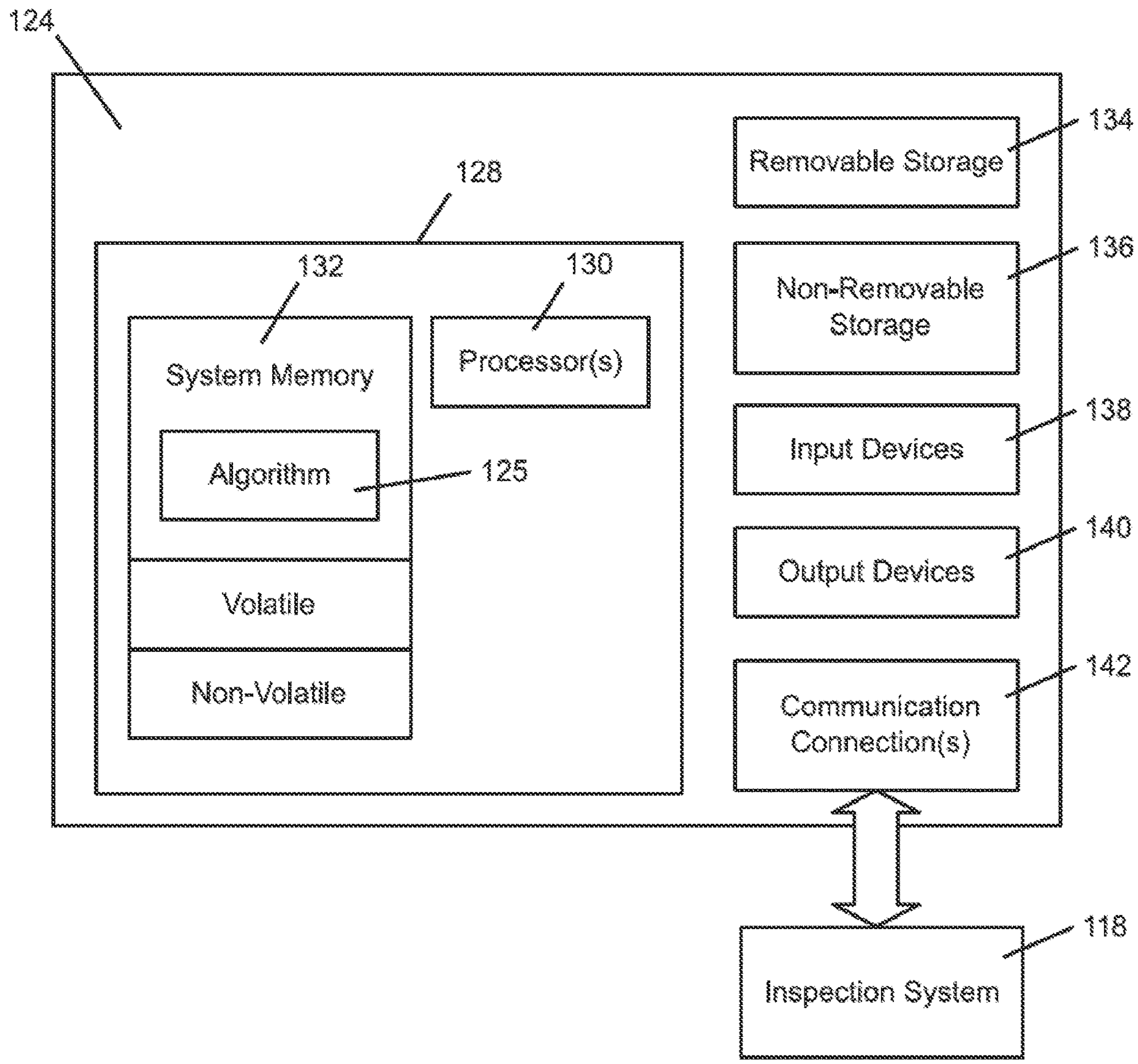
FIG. 8 schematically depicts an example computer subsystem configured to classify defect indicators or determined grouped defect indicators according to a defect type, in accordance with an embodiment of the disclosure.

FIG. 8, illustrates an example computer subsystem 124 configured to provide the functionality described herein. In embodiments, the computer subsystem 124 can be a server and/or other computing device that performs the operations discussed herein, such as the classifying defect operations as described herein. The computer subsystem 124 may include computing components 128. The computing components 128 can include at least one processor 130 and memory 132. The memory 132 can include a non-transient computer readable medium. Depending on the exact configuration, memory 132 (storing, among other things, substrate yield prediction instructions and instructions to perform the other operations disclosed herein) can be volatile (such as RAM), non-volatile (such as ROM, flash memory, etc.), or some combination thereof. Further, the computer subsystem 124 may also include storage devices (removable 134, and/or non-removable 136) including, but not limited to, solid-state devices, magnetic or optical disks, or tape. Further, the computer subsystem 124 may also have input device(s) 138 such as touch screens, keyboard, mouse, pen, voice input, etc., and/or output device(s) 140 such as a display, speakers, printer, etc. One or more communication connections 142, such as local-area network (LAN), wide-area network (WAN), point-to-point, Bluetooth, RF, etc., may also be incorporated into the computer subsystem 124.

In a semiconductor manufacturing process, the inspection tool 118 can examine wafers for microscale defects using high-resolution imaging technology, generating detailed inspection data, which can be transmitted via a high-speed Ethernet connection (e.g., part of communication connections 142) to the computer subsystem 124. Within the computer subsystem 124, the inspection data can be received and stored temporarily in the volatile RAM part of memory 132, ensuring fast access for processing. The processor(s) 130 can execute the defect classification algorithm stored within the non-volatile flash memory component of memory 132 to generate a defect map, highlighting potential defect indicators. The processor 130 can then modify the indicators based on their spatial attributes. The modified defect map can then be analyzed by a machine learning model, also stored in memory 132, which can recognize and classify each defect, determining its type based on learned patterns from historical defect data using the algorithm(s) 125. The results of the classification can be displayed on an output device 140, such as a high-definition monitor, providing users with actionable insights into the wafer's quality and any necessary adjustments to the manufacturing process to minimize such defects in future production runs.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure. In addition, some aspects of the present disclosure are described above with reference to block diagrams and/or operational illustrations of systems and methods according to aspects of this disclosure. The functions, operations, and/or acts noted in the blocks may occur out of the order that is shown in any respective flowchart. For example, two blocks shown in succession may in fact be executed or performed substantially concurrently or in reverse order, depending on the functionality and implementation involved.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art. Further, as used herein and in the claims, the phrase "at least one of element A, element B, or element C" is intended to convey any of: element A, element B, element C, elements A and B, elements A and C, elements B and C, and elements A, B, and C. Further, one having skill in the art will understand the degree to which terms such as "about" or "substantially" convey in light of the measurement techniques utilized herein. To the extent such terms may not be clearly defined or understood by one having skill in the art, the term "about" shall mean plus or minus ten percent.

Although specific embodiments are described herein, the scope of the technology is not limited to those specific embodiments. Moreover, while different examples and embodiments may be described separately, such embodiments and examples may be combined with one another in implementing the technology described herein. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A method for classifying a defect in a manufactured article performed by a defect classification system, comprising:

receiving inspection data generated by an inspection tool inspecting the manufactured article;

generating a defect map with the inspection data, the defect map including an arrangement of potential defect indicators;

modifying a subset of the potential defect indicators based on at least one spatial attribute of the arrangement and based on at least two different spatial attribute thresholds for noise-removal and clustering to generate a modified defect map; and classifying, with the machine learning model, the arrangement of potential defect indicators as a defect in the modified defect map, including determining a defect type of the defect.

2. The method of claim 1, wherein modifying the subset of the potential defect indicators is additionally based on a number of the potential defect indicators in the arrangement.

3. The method of claim 1, wherein modifying the subset of the potential defect indicators is additionally based on a spatial distribution of the potential defect indicators in the arrangement.

4. The method of claim 1, wherein modifying the subset of the potential defect indicators is additionally based on a skewness of the arrangement of the potential defect indicators.

5. The method of claim 1, further comprising identifying a cluster of some of the potential defect indicators that caused the defect.

6. The method of claim 1, further comprising calculating a kernel density of each potential defect indicator.

7. The method of claim 1, wherein the at least one spatial attribute is an adaptive distance unique to the defect map.

8. The method of claim 1, wherein generating the defect map includes combining a plurality of article defect maps, each of the plurality of article defect maps corresponding to a different manufactured article.

9. A computer system for classifying a defect in a manufactured article, comprising:

one or more processors; and non-transitory computer readable storage media encoding instructions which, when executed by the one or more processors, causes the computer system to:

receive inspection data generated by an inspection tool inspecting the manufactured article;

generate a defect map with the inspection data, the defect map including an arrangement of potential defect indicators;

modify a subset of the potential defect indicators based on at least one spatial attribute of the arrangement and based on at least two different spatial attribute thresholds for noise-removal and clustering to generate a modified defect map; and classify, with the machine learning model, the arrangement of potential defect indicators as a defect in the modified defect map, including determining a defect type of the defect.

10. The computer system of claim 9, wherein modifying the subset of the potential defect indicators is additionally based on a number of the potential defect indicators in the arrangement.

11. The computer system of claim 9, wherein modifying the subset of the potential defect indicators is additionally based on a spatial distribution of the potential defect indicators in the arrangement.

12. The computer system of claim 9, wherein modifying the subset of the potential defect indicators is additionally based on a skewness of the arrangement of the potential defect indicators.

13. The computer system of claim 9, wherein the one or more processors, upon executing the instructions encoded in the non-transitory computer readable storage media, further cause the computer system to identify a cluster of some of the potential defect indicators that caused the defect.

14. The computer system of claim 9, wherein the machine learning model:

receives the defect map in a neural network, wherein the neural network comprises a plurality of layers of neurons, including an input layer, one or more hidden layers, and an output layer;

ensures each neuron in each layer is connected to each neuron of a subsequent layer, and the output layer is connected to each neuron of a previous hidden layer of the one or more hidden layers;

assigns a bias value to each neuron in the neural network; and assigns a weight value to each connection in the neural network.

15. The computer system of claim 14, wherein the output layer is configured to produce an image in which at least a portion of one or more of the potential defect indicators are collected into one or more defect groupings.

16. The computer system of claim 15, wherein one or more of the potential defect indicators collected into one or more defect groupings are fit to at least one of a line, a curve, or a shape defined by a closed loop path.

17. The computer system of claim 16, wherein the line or the curve is plotted on the image to indicate a general shape or form of the one or more defect indicators collected into the one or more defect groupings.

18. The computer system of claim 14, wherein the neural network includes a plurality of channels, wherein each channel includes a plurality of layers of neurons, including an input layer and one or more hidden layers, wherein each neuron in each layer is connected to each neuron of a subsequent layer within each channel, and wherein each neuron in each layer is connected to each neuron of the subsequent layer within each of the plurality of channels.

19. A method of grouping two or more defect indicators on a surface of a manufactured article into a defect grouping, the method comprising:

removing, based on a first spatial attribute threshold for noise-removal, a subset of the defect indicators from the surface of the manufactured article; and comparing a distance between a first defect indicator and a second defect indicator to a dynamic second spatial attribute threshold for clustering, wherein the dynamic second spatial attribute threshold is a function of a distribution of at least the first defect indicator and the second defect indicator across the surface of the manufactured article.

20. The method of claim 19, wherein as the distance between the first defect indicator and the second defect indicator increases, a probability of merging the first defect indicator and the second defect indicator into a single defect grouping decreases.

21. The method of claim 19, wherein the dynamic threshold is computed according to the following function:

$$d_{ij} = l e^{\frac{S_h}{S_l{}^{\alpha}}}$$

wherein $d_{ij}$ denotes the distance between the first defect indicator and the second defect indicator, l is a normal distribution distance of the first defect indicator and the second defect indicator, $S_h$is a kernel density of the first defect indicator, $S_l$ is a kernel density of the second defect indicator, and α is a factor to control a density effect.

* * * * *